Nov. 28, 1967  MORIKAZU OMURA ET AL  3,355,676
ELECTRODYNAMICAL OSCILLATING DEVICE
Filed March 18, 1966                                            2 Sheets-Sheet 1
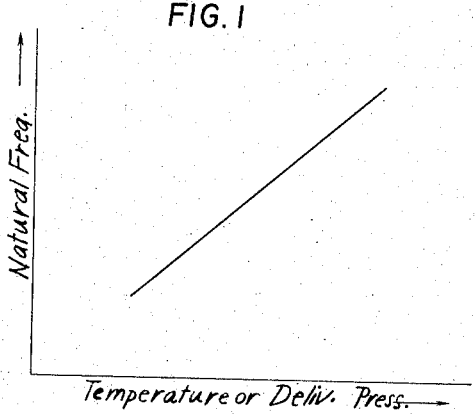
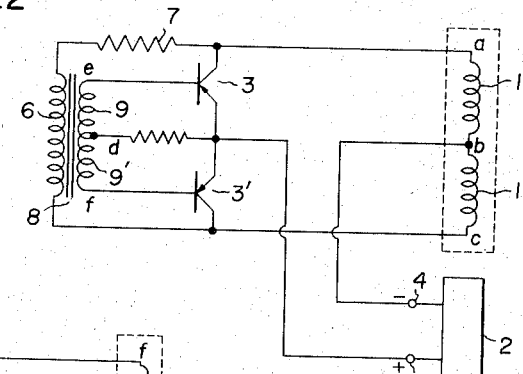
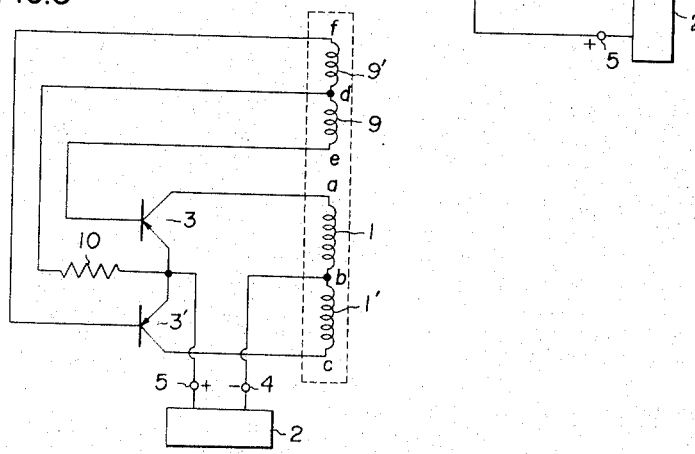
INVENTOR.
Morikazu Omura
Yukio Okuda
BY
Burgess, Ryan & Hicks INVENTOR.
Morikazu Omura
Yukio Okuda
BY
Burgess, Ryan & Hicks

United States Patent Office 3,355,676
Patented Nov. 28, 1967

3,355,676
ELECTRODYNAMICAL OSCILLATING DEVICE
Morikazu Omura and Yukio Okuda, Tokyo, Japan, assignors to Sawafuji Electric Co., Ltd., and Western Trading Co., Ltd.
Filed Mar. 18, 1966, Ser. No. 535,437
Claims priority, application Japan, Mar. 27, 1965, 40/17,722
5 Claims. (Cl. 331—113)

ABSTRACT OF THE DISCLOSURE

An electrodynamical oscillator is disclosed in which the frequency of the electrical oscillator automatically resonates with the actual frequency of the mechanical oscillator. Two symmetrically connected transistors are driven alternately from saturation to cut off by currents induced from moving two oppositely connected coils of the mechanical oscillator.

---

This invention relates to an electrodynamical oscillating device which is driven by alternating current acquired from a direct current source, particularly to an electrodynamical oscillating device wherein the frequency of oscillation of the operating current automatically resonates with the natural frequency of the mechanical vibration system of the device.

The first object of this invention is to provide an electrodynamical oscillating device of small size and light weight.

The second object is to provide an electrodynamical oscillating device wherein the frequency of oscillation of the operating current automatically resonates with the natural frequency of the mechanical vibration system of the device in response to the change of the frequency of the latter so that the device may be operated effectively at the best resonance condition.

The third object of this invention is to provide an electrodynamical oscillating device wherein an electrical conductor is independent of the mechanical vibration of the device.

The invention itself, together with additional objects and advantages thereof, will be best understood by the following description of specific embodiments when read in connection with the accompanying drawings in which:

FIG. 1 shows the characteristics of the change of resonance frequency of the previous electrodynamical oscillating device utilizing an alternating power source;

FIGS. 2 and 3 are electric circuits of the electrodynamical oscillating device embodying this invention;

In those figures, same numerals denote the same parts.

Figure 4:
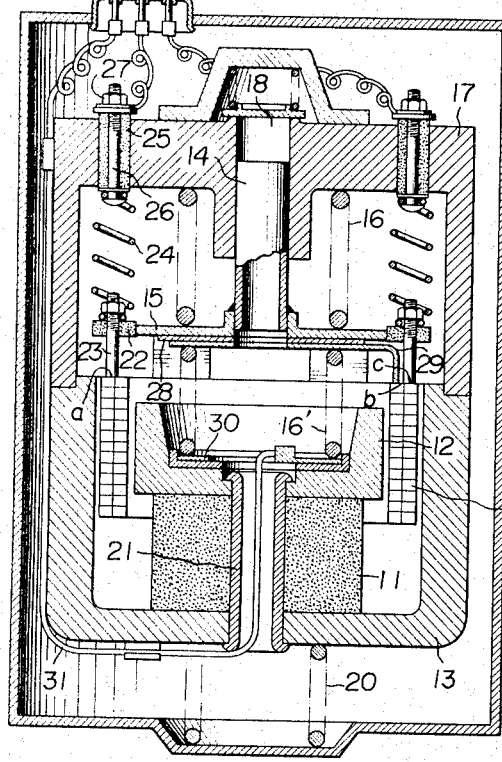
FIG. 4 shows a cross section of the driving system of the electrodynamical oscillating device embodying this invention.

Because the electrodynamical oscillating device is small, light, low priced and economical with high power factor and high efficiency, it has hitherto been widely used in small size refrigerators. But the electrodynamical oscillating device cannot be always operated under the best resonance condition because it utilizes the resonance co-operating mechanical vibration and electrical oscillation and so the change of the power source frequency, the change of gas delivery and suction pressure due to the temperature change in the environment of the refrigerator and the change of the natural frequency of the device due to ununiformity of resonance springs result in discordance between electrical oscillation and mechanical vibration.

In the previous electrodynamical oscillating device, a solenoid coil vertically vibrated outside a cylindrical magnet with the frequency determined by the frequency of operating current supplied from the outer power source. This vibration was amplified by a resonance spring, a piston mechanically connected to the resonance spring reciprocated in the cylinder and gas was compressed in the cylinder. In this system the frequency of mechanical vibration is determined by the frequency of the operating current as above-mentioned. Therefore, both systems, electrical and mechanical, have to be put into resonance in order to operate the electrodynamical oscillating device at the highest efficiency. The resonance frequency depends on the relation between the resonance spring, which produces resonance of the mechanical vibrator composed of the coil and the piston, and compressed gas. Said relation is shown by a formula:

$$f = \frac{1}{2\pi}\sqrt{\frac{K}{M}}$$

where $f$: resonance frequency=the frequency of the operating current=the natural frequency of mechanical vibration system $K$: the elastic constant of the mechanical vibration system=the elastic constant of the resonance spring+the elastic constant of compressed gas $M$: the mass of mechanical vibration system K is not always fixed but may vary due to the change of temperature and the change of gas delivery and suction pressure which depend on the operating condition of the refrigerator. The magnitude of the change is equivalent to about 8 cycles sec.$^{-1}$ in conversion to resonance frequency during the time from start to steady state of the device and to 3 cycles sec.$^{-1}$ when the temperature of surroundings changes from 20° C. to 40° C. in the case using a device for the refrigerator. As shown in FIG. 1, the resonance frequency is low at start and/or low temperature but it becomes higher at steady state operation and/or high temperature.

On the other hand, because the frequency of the operating current is always constant (that is 60 cycles sec.$^{-1}$) and it is independent of the change of frequency of the mechanical vibration system, the device cannot always be operated in the best resonance condition but in most cases it may be operated at a frequency which deviates from the resonance frequency with 2 to 3 cycles sec.$^{-1}$.

Therefore, it is absolutely impossible to make complete resonance between the frequency of the operating current and the mechanical vibration system in the operation of previous electrodynamical oscillating device, wherein the frequency of the operating current was made to coincide with the frequency of the mechanical vibration system. Said defects have been removed in this invention wherein both systems, electrical oscillation system and mechanical vibration system, are put in the complete resonance with each other and the frequency of the operating current changes automatically in response to the change of the natural frequency of the mechanical vibration system.

In FIGS. 2 and 4, solenoidal coils 1 and 1' are shown in an electrodynamical oscillating device to operate the mechanical vibration system of the device (hereinafter they are referred to as moving coils). The coils are wound in the form of the air-core solenoid and connected in series. Both their ends and the intermediate point are connected to terminals $a$, $c$, and $b$, respectively. The moving coils 1 and 1' incorporated in one are positioned, as shown in FIG. 4, in radial magnetic flux created by a permanent magnet 11, a pole piece 12 and a yoke 13, and they are mechanically connected to a disk-like flange 15 welded with a piston 14 to transmit the motion of the coils to the piston. The flange 15 that is supported by resonance springs 16 and 16' moves in the direction of and in response to the electromagnetic force which actuates the moving coils. Thus the mechanical vibration system is composed of the moving coils 1 and 1', the flange 15, the piston 14 and the resonance springs 16 and 16'. Transistors 3 and 3' are symmetrically and push-pull-wise connected to a power circuit, a load circuit and a control circuit. The intermediate terminal $b$ of the moving coils 1 and 1' is connected to the negative terminal 4 of a unidirectional power source 2, the emitters of the transistors 3 and 3' are together connected to the positive terminal 5 of the unidirectional power source 2 and the collectors of the transistors are connected to the terminals $a$ and $c$ of the moving coils 1 and 1', respectively. The primary winding 6 of a control transformer and a current limiting resistor 7 are connected in series between the collectors of transistors 3 and 3'. The primary winding 6 is wound around an iron core 8 and secondary windings 9 and 9' are also wound around the same. The terminals $e$ and $f$ of the secondary windings 9 and 9' are connected to the bases of the transistors 3 and 3', respectively, and an intermediate terminal $d$ common to the windings 9 and 9'. And an intermediate terminal $d$ is connected to the emitters of the transistors 3 and 3' through a base resistor 10.

In FIG. 2, assuming that current is supplied from the unidirectional power source 2 and current in the transistor 3 is larger than current in the transistor 3' due to the unbalance of the two, and therefore, current in the moving coil 1 is larger than current in the moving coil 1' and the magnetomotive forces of both coils are not equal to each other. As the moving coils 1 and 1' are positioned in a magnetic field, the electromagnetic force is generated. The resonance springs 16 and 16' are contracted or expanded by the moving coils and the moving coils are displaced until equilibrium is achieved between elastic force of the springs and the electromagnetic force. As the moving coils are displaced, counter electromotive force is generated between both end terminals $a$ and $c$ of the moving coils 1 and 1' and voltage is supplied to the current limiting resistor 7 and the primary winding 6 of the control transformer, and it results in inducing voltage in the secondary windings 9 and 9'. Current due to this voltage flows between the emitter and the base of the transistor 3 through the resistor 10 while no current flows in transistor 3' because the base and the emitter are connected in the inverse sense against the voltage. Accordingly, the transistor 3 supplies still more current to the moving coil 1 than the transistor 3', and then the moving coils 1 and 1' move further more, therefore larger counter electromotive force is increasingly produced, still higher voltage is applied to the primary winding 6 of the control transformer and current fed to the transistor 3 from the secondary winding 9 of the control transformer. The base current is increased more and more until the transistor 3 is saturated, and then the whole voltage of the unidirectional power source 2 is put on the moving coil 1. Therefore, current in the moving coil 1 increases, the moving coils 1 and 1' displace to balance with the resonance springs 16 and 16'. Counter electromotive force is induced in response to the induced voltage. Thus, the transistor 3 is put into an active region by the increase of the collector current and the voltage between the collector and the emitter drops until the current is completely cut off. As the cut-off time is extremely short the voltage induced in the secondary windings 9 and 9' of the control transformer has a direction opposite to the before-mentioned case. The induced voltage produces a current between the emitter and the base of the transistor 3', and then the transistor 3' is saturated and the whole voltage of the unidirectional power source 2 is put on the moving coil 1'. Therefore, an electromagnetic force of the opposite direction to the direction in the before-mentioned case actuates the moving coils 1 and 1' and they will displace along the direction of the force. The electromagnetic force has the same direction as the elastic, reactional deformation of the contraction and expansion of the resonance springs. Accordingly, the moving coils 1 and 1' are displaced opposite to the direction of the electromagnetic force of the moving coil 1 and the transistor 3' gets into an active state due to the increase of its collector current the same way as in the above mentioned case until the current in the transistor 3' is cut off and then the transistor 3 is put in start and electromagnetic force of opposite direction is generated in the moving coil 1. The above-mentioned operations are repeated, and the mechanical system of the device continues vibration.

Now the principle how and why the electrodynamical oscillating device is operated always in the complete resonance state will be understood by the following description.

Figure 6:
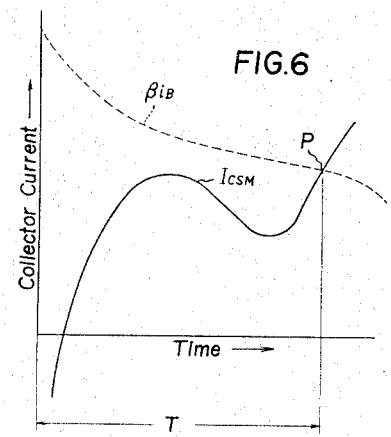
FIG. 6 shows the characteristics of the current of the electrodynamical oscillating device of this invention.

The electrodynamical oscillating device starts as before mentioned and comes to vibrate in a steady state after a few cycles. In FIG. 6 the axis of abscissa shows time and the axis of ordinate shows the current in the collector circuit of the transistor 3. A curve $\beta i\text{B}$ shows the product of the current amplification factor $\beta$ and the base current $i_B$ of the transistor 3 and it means a critical curve between the saturated region and the active region of the transistor 3. A curve $I_{CSM}$ shows the load current in the moving coil 1 when rectangular wave is supplied to the device. The load current is determined by the load of the device, the counter electromotive force and the elastic constant of the resonance springs 16 and 16'. The load current is equal to the collector current of the transistor 3. The collector current of the transistor 3 is cut off at the intersectional point of curves $\beta i\text{B}$ and $I_{CSM}$, and at the same time the transistor 3' starts to operate. The operation of the transistor 3' is entirely the same as that of the transistor 3 and both operations are repeated alternately. All these operations have relation to the vibration of the moving coils 1 and 1' and hence the frequency of the operating current (load current) is to completely coincide with the frequency of the mechanical vibration system of the device.

Figure 7:
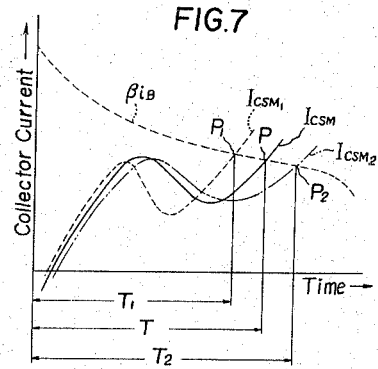
FIG. 7 shows the characteristics of the change of the current for the purpose of explaining the resonance principle of the electrodynamical oscillating device of this invention.

In FIGS. 6 and 7, the relationship between the time T from starting point of the transistor to a point P and the operating frequency $f$ of the electrodynamical oscillating device is as follows:

$$f = \frac{1}{2T}$$

As shown before, the operating frequency $f$ should always coincide with the natural frequency of the mechanical vibration system of the electrodynamical oscillating device in order that the electrodynamical oscillating device resonate. If the voltage of the unidirectional power source is constant, the curve $\beta i\text{B}$ depends on the current limiting resistor 7 and the base resistor 10 in FIG. 2. Therefore, it is possible at first to make the operating frequency equal to the predetermined natural frequency of the mechanical vibration system of the electrodynamical oscillating device by means of controlling the current limiting resistor 7 and the base resistor 10. But the natural frequency of the mechanical vibration system of the electrodynamical oscillating device depends on the operating condition, for example, the natural frequency increases when the gas delivery-suction pressure increases. Therefore, the resonance frequency of the mechanical vibration system and the electrical oscillation system also increases. In this case, $I_{CSM}$ is represented by the oscillating wave form $I_{CSM1}$ which has a short period. The relation between $f$, $f_1$ and $T_1$ is shown as follows where $f_1$ is the frequency of the oscillation system and $T_1$ is the time taken to arrive at the intersection $P_1$ of the curves $I_{CSM1}$ and $\beta iB$:

$$f < f_1 = \frac{1}{2T_1}$$

When gas delivery and suction pressure decreases and when the operation has just started, the situations are vice versa, which are shown by a curve $I_{CSM2}$, a point $P_2$ and time $T_2$ in FIG. 7 and the oscillation frequency $f_2$ in this case is as follows:

$$f > f_2 = \frac{1}{2T_2}$$

But in this invention, even if the natural frequency of the mechanical vibration system varies as in above-mentioned state, the frequency of the operating current changes in accordance with the natural frequency of the mechanical vibration system and resonate with it as described in connection with FIG. 2. After all, if elements of the operating electric circuit are preset so that the frequency of the electrodynamical oscillating compresser coincides with the natural frequency of the mechanical vibration system, both systems, electrical oscillation system and mechanical vibration system, are in the complete resonance state during all the operation time of the electrodynamical oscillating device.

In another embodiment of this invention shown in FIG. 3, the moving coils 1 and 1' are put in place of the primary winding 6 of the control transformer of FIG. 2 as well as of the moving coils and the secondary windings 9 and 9' are wound round the moving coils 1 and 1' with one body. It will be well understood that the operation of the circuit of FIG. 3 is quite the same as that of FIG. 2.

In the electric circuits of FIGS. 2 and 3, semiconductor controlled rectifiers or similar switching elements may be utilized instead of the transistors 3 and 3'.

Details of the other parts of the electrodynamical oscillating device of FIG. 4 are as follows: A cylinder 17 covers the yoke 13 and has a cylinder 18 at its own center. The compressor members are supported at the bottom of a housing 19 through a support spring 20. The both ends of a cylindrical fixing member 21 are calked and the pole piece 2, the permanent magnet 11 and the yoke 13 are fixed as one body by the fixing member. The terminal $a$ of the moving coil 1 is connected to a bolt 23 supported through an insulator 22 by the flange 15 and the terminal $a$ is finally electrically connected to the load circuit of the switching element through a connecting spring 24, a bolt 26 supported through an insulating cylinder 25 by the cylinder 17, a nut 27 and a terminal $a'$. The intermediate terminal $b$ is connected to a lead plate 29 fixed through an insulating plate 28 to the flange 15 and the terminal $b$ is finally connected to the negative terminal of the unidirectional power source units 12 at high pressure through ducts 54.
through the resonance spring 16', a lead ring 30, a lead 31 and the terminal $b'$. The terminal $c$ of the moving coil 1' is connected through the terminal $c'$ to the load circuit of the switching element in the same way in the case of terminal $a$. The intermediate terminal $b$ may be connected to the power source through the same path as the paths of the terminals $a$ and $c$ instead of the above-mentioned way.

If the secondary windings 9 and 9' used for controlling the control grid of the switching element are wound as one body with the moving coils 1 and 1', the terminals $e$, $d$ and $f$ are connected to the external members in the same way as terminals $a$ and $b$.

Figure 5:
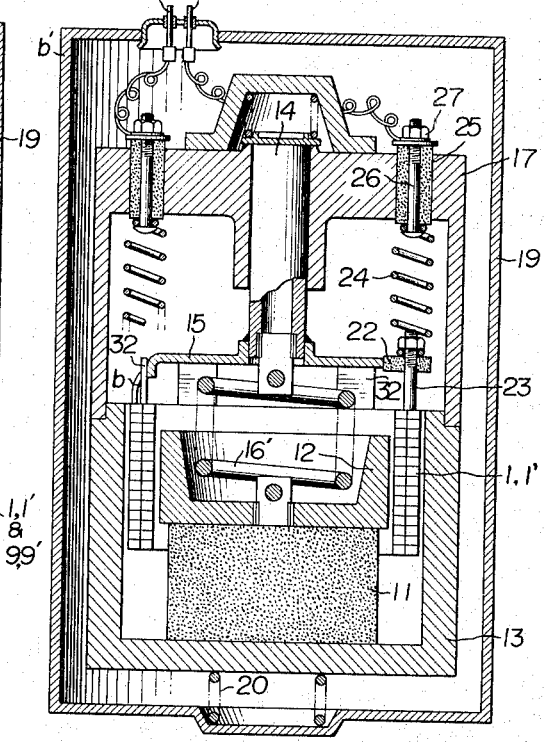
FIG. 5 shows a cross section of another embodiment of this invention.

In FIG. 5 still another embodiment of this invention utilized for a low voltage power source or a small size apparatus is shown. In this type, there being only one resonance spring, the terminals $a$ and $c$ are connected to the external members in the same manner as shown in FIG. 4 but the intermediate terminal is directly connected by welding or other means to a lead plate 32 of the metal bobbin of the moving coils 1 and 1', and the terminal is led to the housing 19 through the flange 15, the resonance spring 16, the pole piece 12, the permanent magnet 11, the yoke 13 and the support spring 20. The structure of the electro dynamical oscillating device of this type is simple and it is preferably applied to the small size devices.

Since obvious modifications may be made to the electrodynamical oscillating device of this invention by those skilled in the art without departing from the spirit and scope of the invention, we intend to be limited only by the appended claims.

What is claimed is:

1. An electrodynamical oscillating device, wherein the natural frequency of the mechanical vibration is completely resonant with the frequency of oscillation of the electrical system, comprising:

a mechanical vibration system including a pair of serially connected oppositely wound moving coils situated between a pair of resonance springs so as to oscillate, alternately compressing and stretching the springs, and an electrical vibration system including a pair of symmetrically connected transistors alternately driven between saturation and cut off by the electromotive forces generated by the displacement of said moving coils, thereby creating the alternating current which causes the moving coils to oscillate.

2. An electrodynamical oscillating device as in claim 1, wherein said transistors have emitters and collectors and said emitters are connected together and the collectors are connected to the terminal ends of said pair of moving coils.

3. An electrodynamical oscillating device as in claim 2 including a control transformer wherein the collectors of said transistors are connected to the terminal ends of the first winding of said control transformer, the bases of said transistors are connected to the terminal ends of the second winding of said transformer and the emitters of said transistors are connected to the center tap of the second winding of said transformer.

4. An electrodynamical oscillating device as in claim 2 including a direct current source connected between the emitters of said transistors and the connection between the said serially connected moving coils.

5. An electrodynamical oscillating device as in claim 1 including a control winding wound on the same axis as said moving coils, wherein the transistors are controlled by said control winding.

References Cited

UNITED STATES PATENTS 2,574,136 11/1951 Warren _____ 331—156
3,151,284 9/1964 Kleesattel _____ 331—116

ROY LAKE, *Primary Examiner.*

S. H. GRIMM, *Assistant Examiner.*

UNITED STATES PATENT OFFICE
CERTIFICATE OF CORRECTION

Patent No. 3,355,676          November 28, 1967

Morikazu Omura et al.

It is hereby certified that error appears in the above numbered patent requiring correction and that the said Letters Patent should read as corrected below.

Column 5, line 57, strike out "units 12 at high pressure through ducts 54.".

Signed and sealed this 7th day of January 1969.

(SEAL)
Attest:

Edward M. Fletcher, Jr.          EDWARD J. BRENNER
Attesting Officer                Commissioner of Patents